United States Patent [19]
Ford, Sr.

[11] Patent Number: 6,019,034
[45] Date of Patent: Feb. 1, 2000

[54] APPARATUS FOR TREATMENT OF LIQUOR

[76] Inventor: Clifton K. Ford, Sr., 2807 Glenn Lakes, Missouri City, Tex. 77459

[21] Appl. No.: 09/363,487

[22] Filed: Jul. 29, 1999

[51] Int. Cl.[7] .............................. A23L 1/00; A47J 27/00; C12H 1/00

[52] U.S. Cl. .......................... 99/472; 99/277.1; 99/277.2; 99/323.1; 141/65

[58] Field of Search ......................... 99/472, 454, 277.1, 99/277.2, 278, 323.1; 141/64, 65; 53/510; 426/474, 475, 494, 488, 592; 202/185.5, 197, 205

[56] References Cited

U.S. PATENT DOCUMENTS

| | | | |
|---|---|---|---|
| 35,900 | 7/1862 | Speed et al. | 426/475 |
| 96,201 | 10/1869 | Clark | 426/475 |
| 172,283 | 1/1876 | Sweet | 99/472 X |
| 246,294 | 8/1881 | Cushing et al. | 426/475 |
| 343,973 | 6/1886 | Wehrie | 426/494 |
| 604,996 | 5/1898 | Maiche | 426/488 |
| 2,117,604 | 5/1938 | Fessler et al. | 426/592 |
| 3,420,674 | 1/1969 | McCartney | 426/472 |
| 4,512,251 | 4/1985 | Green | 99/472 |
| 4,552,286 | 11/1985 | Kuckens et al. | 99/323.1 |
| 4,785,724 | 11/1988 | Vassallo | 99/323.1 |
| 5,485,779 | 1/1996 | Evans et al. | 99/472 X |
| 5,566,730 | 10/1996 | Liebmann, Jr. | 141/64 |

*Primary Examiner*—Timothy Simone
*Attorney, Agent, or Firm*—Bracewell & Patterson L.L.P.

[57] ABSTRACT

An apparatus is provided for improving the flavor of distilled liquor by applying a vacuum to remove volatile compounds. The apparatus allows a consumer to treat various kinds of liquor in differing quantities regardless of the size or shape of the liquor bottle. A pitcher serves as a receiving vessel for the liquor to be treated. The pitcher has a hollow handle which, in conjunction with a vacuum stand, allows air to be drawn through the hand and discharged into the liquor at the bottom of the pitcher. The vacuum stand is especially adapted to sealingly receive the pitcher and cause air to flow through the liquor. The pitcher is placed on the vacuum stand, a lid portion of the stand is placed over the pitcher to create a seal, and a vacuum is applied on the contents of the pitcher. Air is drawn through the hollow handle and percolates or bubbles out at the base of the pitcher, creating agitation of the liquor and causing removal of the volatile compounds. Removal of volatile compounds utilizing this apparatus improves the taste of the liquor.

19 Claims, 7 Drawing Sheets

APPARATUS FOR TREATMENT OF LIQUOR

BACKGROUND OF THE INVENTION

1. Field of the Invention

This invention pertains to an apparatus for use by a consumer to treat liquor to improve its flavor.

2. Description of the Related Art

It has long been known that certain components of distilled liquors which are residues of the fermentation process can cause the liquor to have an undesirable aftertaste or bitter flavor. Attempts have been made as part of the production process of liquor distillation to remove some of these undesirable components. U.S. Pat. Nos. 35,900 and 96,201 are representative of treatment of liquor during its initial production in an effort to remove the unpleasantly tasting residues.

U.S. Pat. No. 5,778,763, of which applicant is the inventor, relates to an apparatus and a process for vacuum treatment of liquor in its original bottle. An adaptor with an air inlet tube is sealed over the mouth of the bottle and a vacuum is applied to remove volatile compounds. Often, however, consumers of liquor have available varying volumes of liquor which are purchased in a wide variety of bottles in different sizes and shapes. This prior art apparatus does not allow the consumer to treat varying amounts of liquor and does not accommodate various bottle shapes and sizes. So far as it is known, there has been no readily available way to accomplish this.

SUMMARY OF THE INVENTION

Briefly, the present invention provides an apparatus for improving the flavor of distilled alcoholic beverages or liquor. It includes a pitcher with an internal air passageway that allows air to be drawn into the pitcher and discharged at the base of the pitcher. The liquor to be treated is poured into the pitcher. Various volumes of liquor, such as from bottles of one pint to 1.75 liters, may be treated. The use of the pitcher also eliminates the problems associated with requiring a vacuum device that is compatible with the large variety sizes and shapes of liquor bottles. The pitcher is then placed on the vacuum stand which is especially adapted to receive the pitcher. A sealing cover is closed over the rim of the pitcher to create an airtight seal. The sealing cover also has a port through which a vacuum may be drawn from a vacuum pump. When the vacuum is applied, air is drawn through the air passageway in the pitcher and bubbles through the liquor from the bottom of the pitcher. The liquor is agitated and undesirable volatile compounds are thereby removed. A timer with a pause feature is utilized to control the time for treatment. Liquor treated through use of this invention has been found to exhibit a noticeably smoother taste.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The present invention is an apparatus for treatment of liquor which includes a pitcher 11 and a vacuum stand 13 especially adapted to receive the pitcher 11. Liquor is poured into the pitcher 11 which is placed on the vacuum stand 13 to be treated. Various volumes of liquor may be treated using the present invention to remove undesirable volatile compounds from the liquor thereby improving its taste. The present invention may be used with various kinds of distilled liquor, such as whiskey, bourbon, scotch, rum, brandy, cognac, liqueurs, vodka, gin, and the like. The present invention may also be used to treat liquor in varying amounts regardless of the shape and size of the original liquor bottle.

Figure 1:
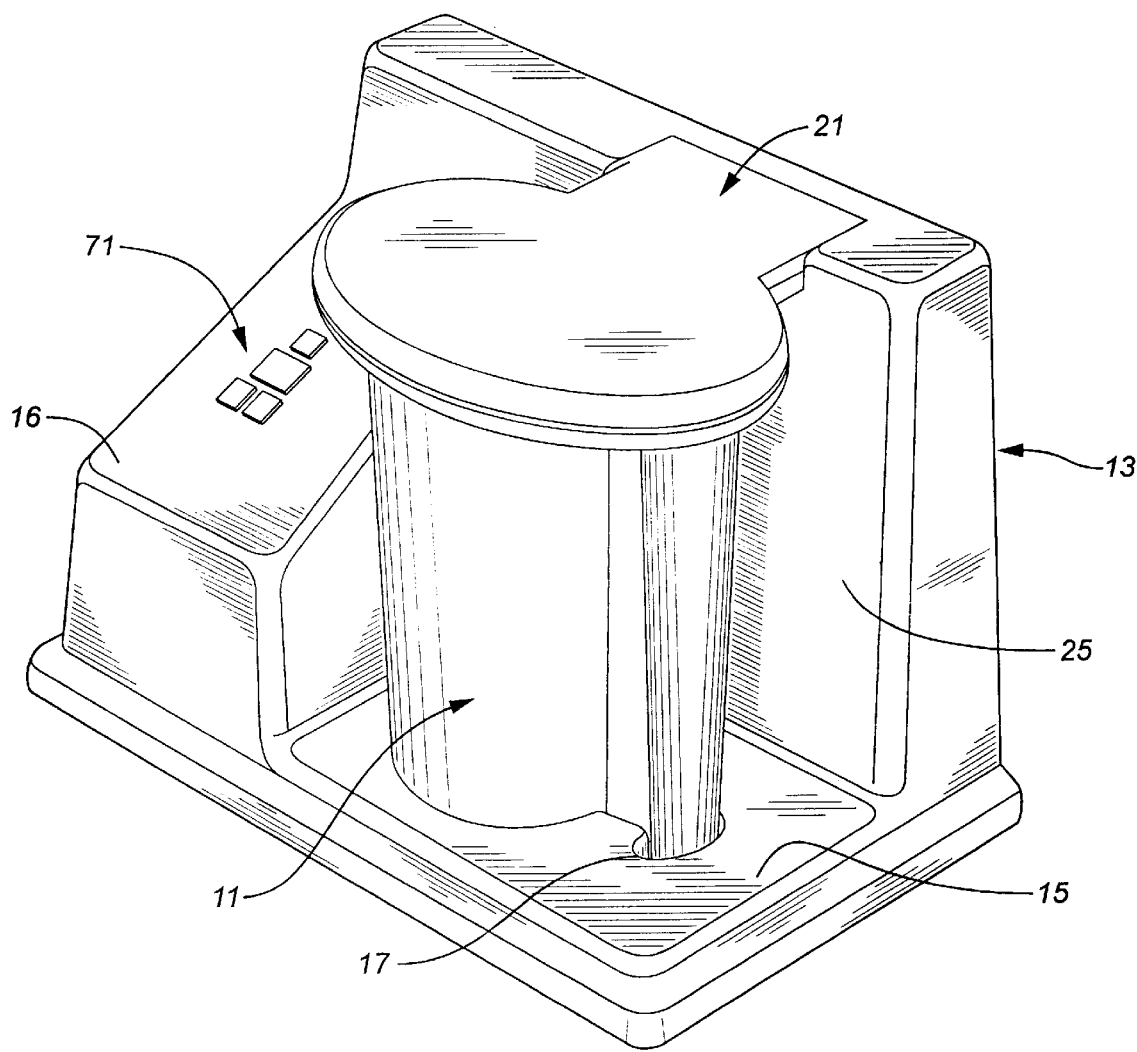
FIG. 1 is a three dimensional view of the present invention.
Figure 2:
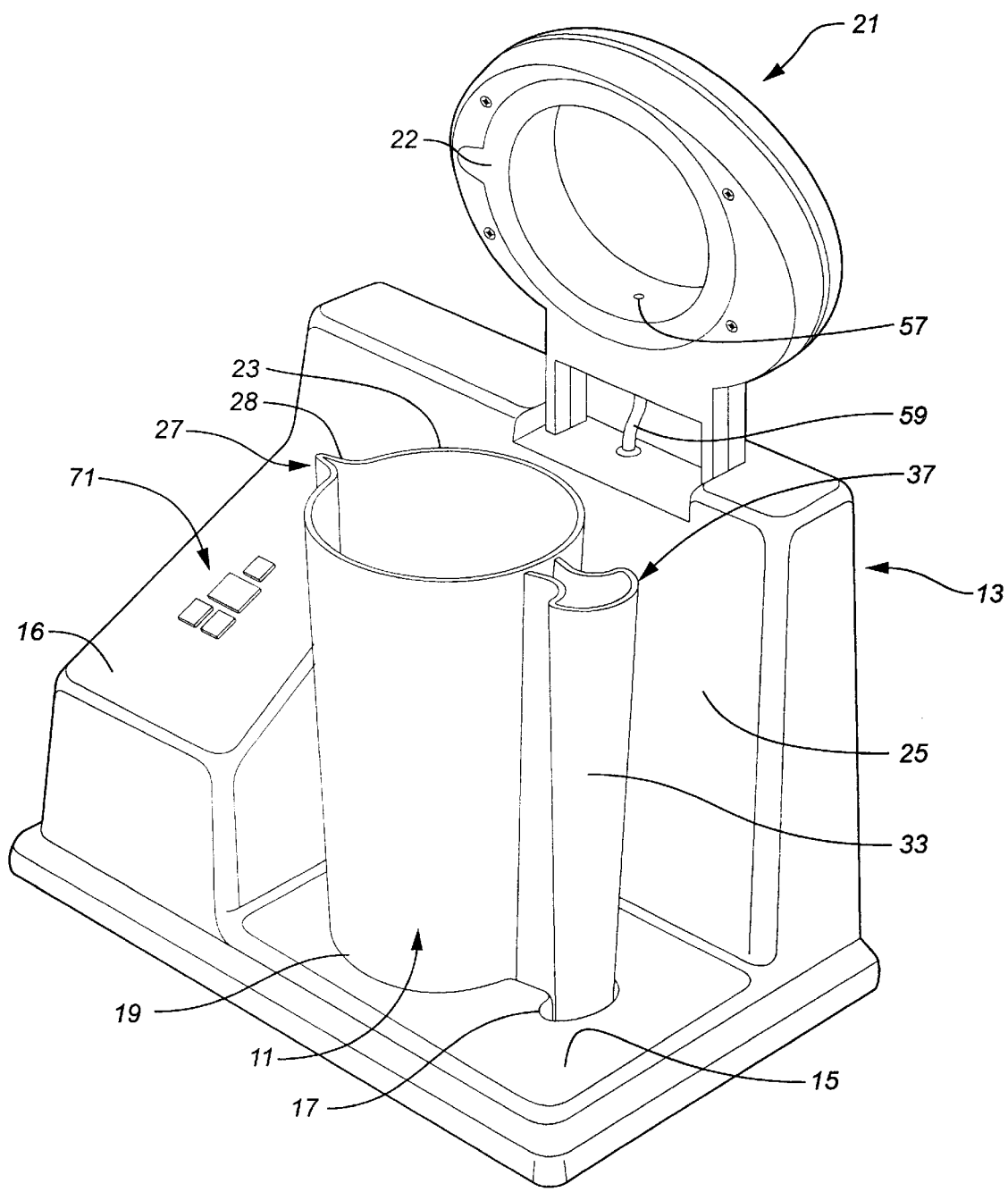
FIG. 2 is a three dimensional view of the present invention with the sealing cover in the open position.
Figure 3:
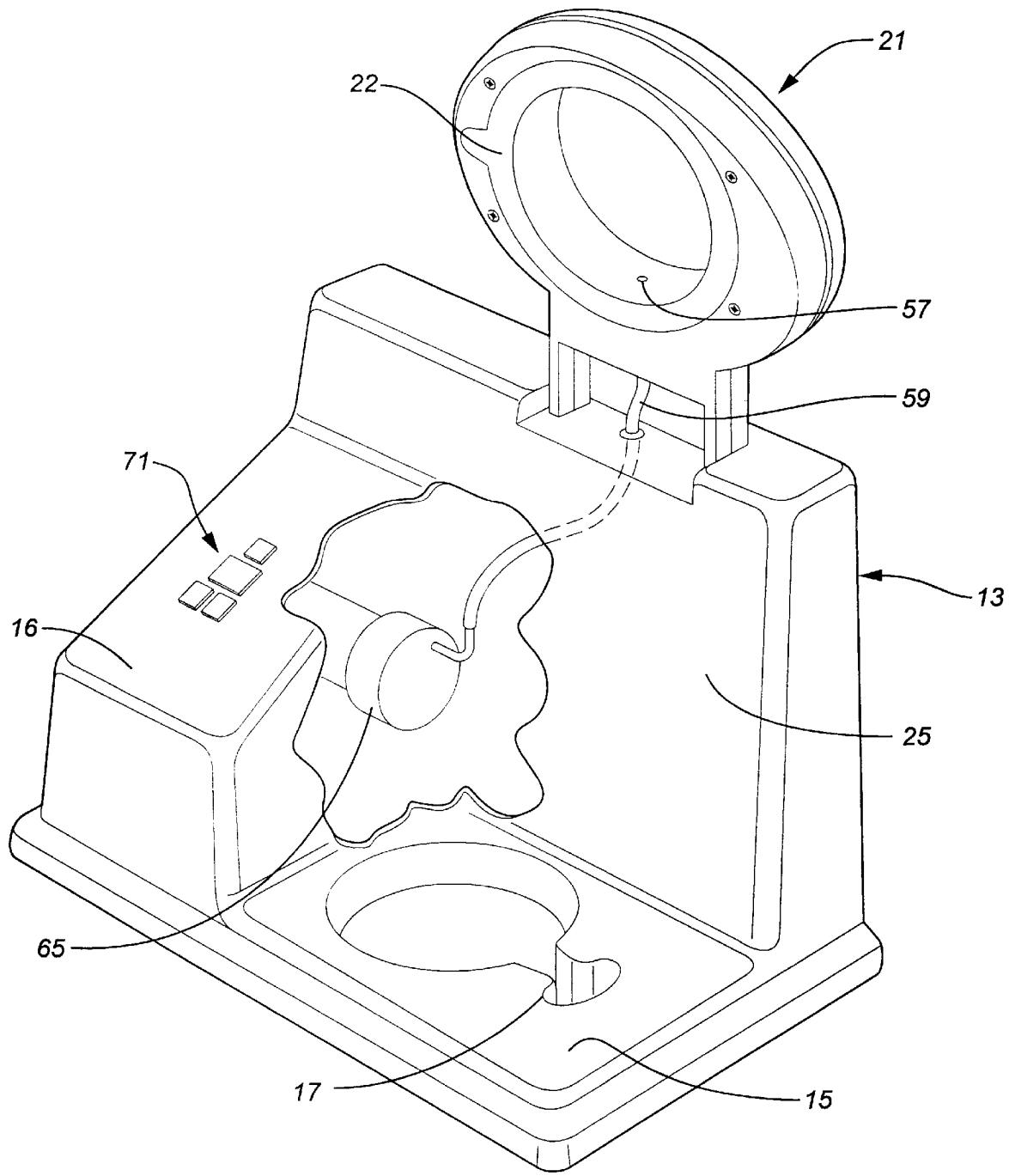
FIG. 3 is a three dimensional view of the present invention without the pitcher and with a partial cutout, showing the vacuum pump and motor.

The pitcher 11 of the present invention is made of a clear plastic material. The pitcher may be made of various types of plastic, ceramic, or glass so long as it is suitably rigid. With reference to FIG. 2, the pitcher 11 sits is placed on the base 15 of the vacuum stand 13. The base 15 has an alignment recess 17 which is shaped to match the support base 19 of the pitcher 11. The alignment recess 17 is located on the base 15 so that when the pitcher 11 is placed in the alignment recess 17 of the vacuum stand 13, the pitcher 11 is properly positioned for the sealing cover 21 to be lowered and create a seal with the rim 23 of the pitcher 11. The sealing cover 21 is mounted with a hinge on the back 25 of the vacuum stand 13. FIG. 1 shows the pitcher placed on the vacuum stand with the sealing cover in the closed position. FIG. 2 shows the sealing cover in the open position which allows the pitcher to be removed from the vacuum stand. When the sealing cover 21 is closed the seal 22 makes contact with the rim 23 of the pitcher to make a seal. The seal 22 is typically a flat rubber gasket of the proper size and shape to cover and seal with the rim of the pitcher, including the portion of the rim that forms the spout 27.

Figure 4:
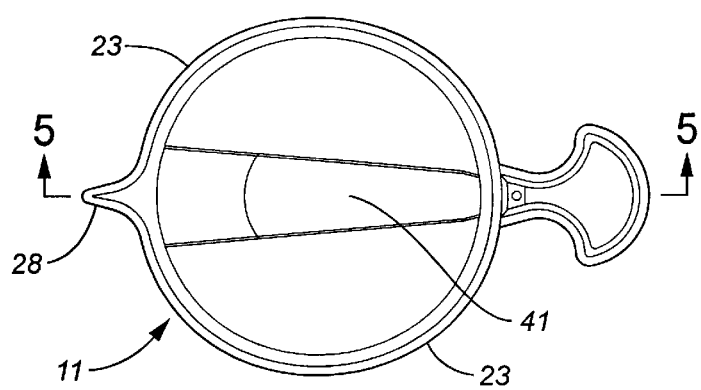
FIG. 4 is a top view of the pitcher of the present invention.
Figure 5:
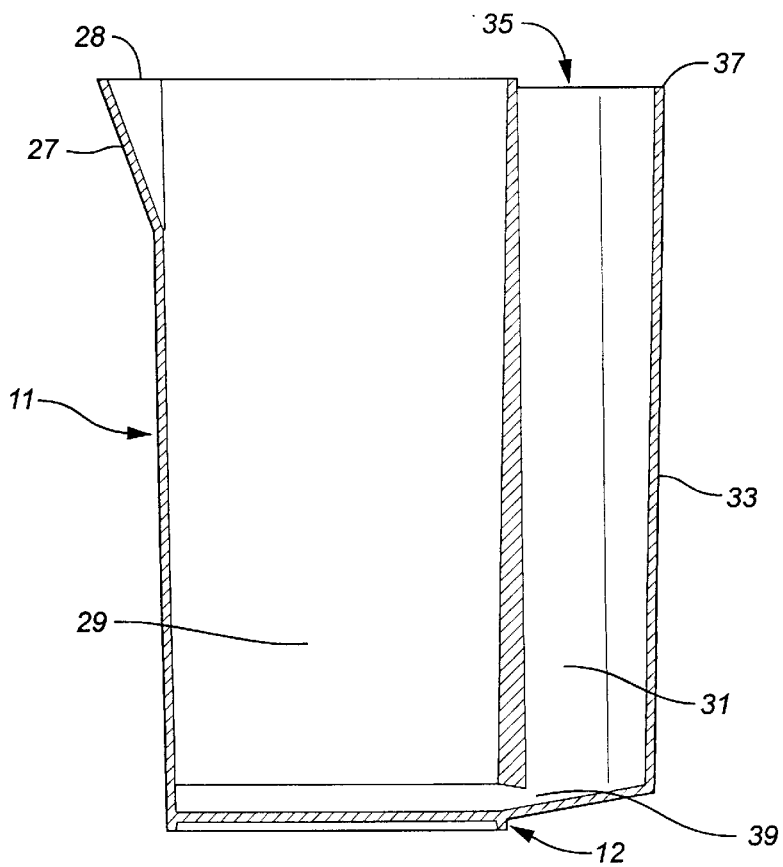
FIG. 5 is a cross sectional view of the pitcher taken along the line 5—5 of FIG. 4.

With reference to FIGS. 4 and 5, the pitcher 11 of the preferred embodiment has a cylindrical shaped body 29. The walls of the body 29 may also be tapered to some extent from the bottom to the top of the pitcher. The body has a spout 27 to facilitate pouring liquor out of the pitcher. The rim of the spout 28 is at the same elevation as the rim 23 of the pitcher so they will both come in sealing contact with the flat seal 22 in the sealing cover 21. The pitcher 11 has an internal air passageway 31 that runs from just below the rim 23 to the support base 12. In the preferred embodiment, the air passageway 31 runs through the hollow handle 33. The top of the handle also has a rim 37 that forms an opening creating an air inlet 35. The handle rim 37 is at a slightly lower elevation from the rim 23 of the pitcher so that the air inlet 35 is not blocked when the sealing cover 21 is placed over the pitcher to create a seal with the rim 23. The elevation of the handle rim 37 is not more than ¼ inch below the rim of the pitcher, so as to maximize the fluid capacity of the pitcher 11.

Figure 6:
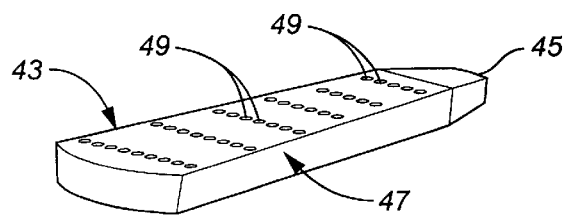
FIG. 6 is a three dimensional view of the diffusion manifold of the present invention.
Figure 7A:
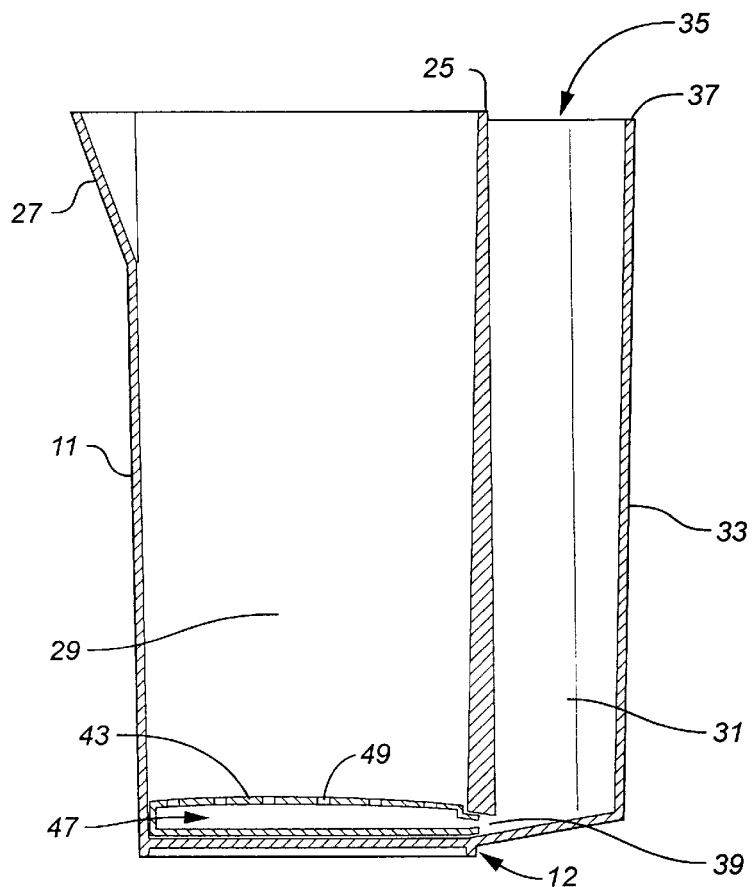
FIG. 7A is a cross sectional view of the pitcher taken along the line 5—5 of FIG. 4 showing the diffusion manifold installed.
Figure 7B:
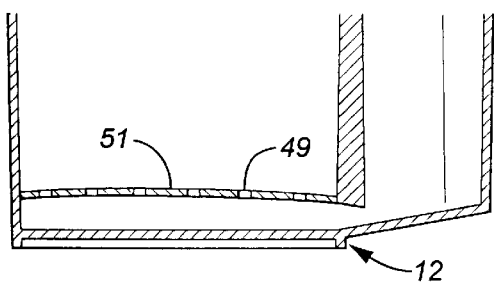
FIG. 7B is a cross sectional view taken along the line 5—5 of FIG. 4 showing an alternate embodiment of the present invention where a diffusion cover is used in lieu of a diffusion manifold.
Figure 7C:
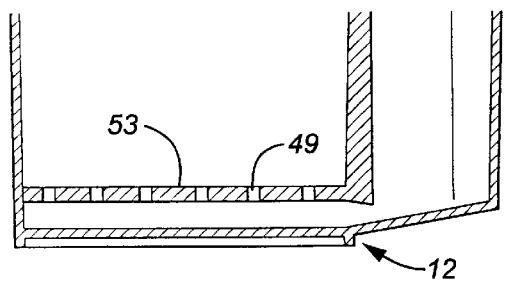
FIG. 7C is a cross sectional view of an alternate embodiment of the present invention where the diffusion manifold is molded permanently into the support base of the pitcher.

At support base 19 and at the bottom of the hollow handle 33, an air opening 39 penetrates the wall of the pitcher so that there is fluid communication between the hollow handle 33 and the contents of the pitcher body 29. In the preferred embodiment, the support base 12 also has a receptor slot 41 formed in a trapezoid-like shape with the narrow end adjacent to the air opening 39. The receptor slot 41 is shaped to receive the diffusion manifold 43 which frictionally fits into the receptor slot 41. As shown in FIG. 6 the diffusion manifold 43 has a manifold inlet 45 and an internal air cavity 47. When the diffusion manifold 43 is fitted into the receptor slot 41, the manifold inlet 45 fits snugly in the air opening 39 so that all the air passing through the air opening 39 enters the diffusion manifold 43. A multitude of percolation holes 49 are placed on the top surface of the diffusion manifold 43. FIG. 7A shows a cross sectional view of the diffusion manifold 43 installed in the receptor slot 41 as described above. Alternatively, a diffusion cover 51 can be used to snap over the receptor slot 41 as shown in FIG. 7B. As a further alternative, the diffusion manifold can be molded permanently into the support base 12 of the pitcher as shown in FIG. 7C. Each of these embodiments permit air to be drawn into the body 29, from the air inlet 35, through the internal air passageway 31, through the air opening 39, into the diffusion manifold, and percolating into the liquor through the holes at the bottom of the pitcher. The diffusion manifold disperses the air in small bubbles in the liquor to facilitate the removal of volatile compounds by creating agitation and increasing the air to liquid interface.

Figure 8:
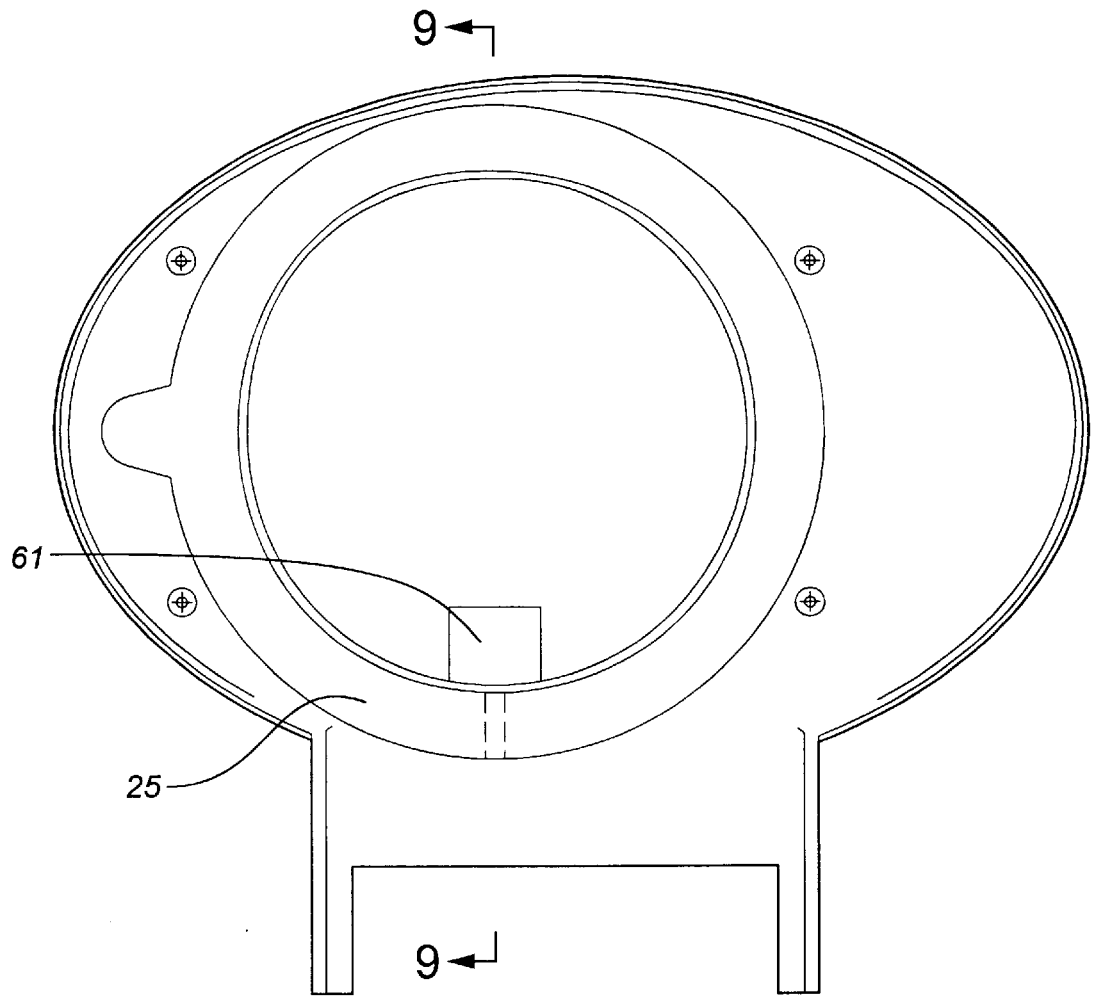
FIG. 8 is a bottom view of the sealing cover of the present invention.
Figure 9:
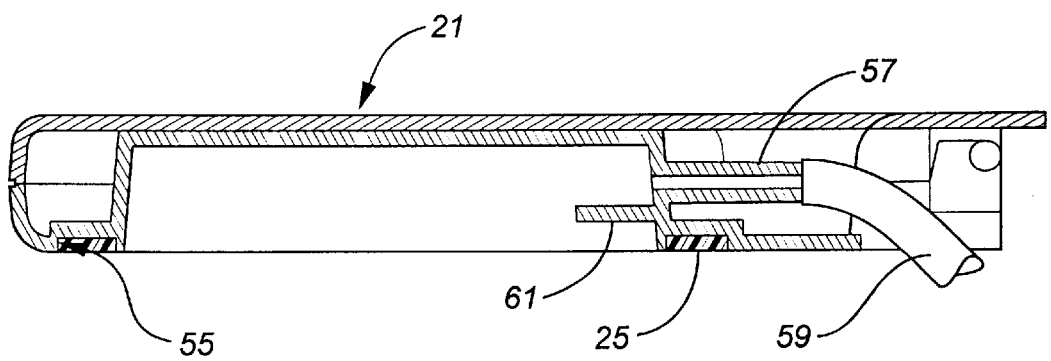
FIG. 9 is a cross sectional view of the sealing cover taken along the line 9—9 of FIG. 8.

With reference to FIG. 8, the sealing cover 21 has a seal 22 that engages with the pitcher rim 23 and the spout rim 28 to create a seal. The seal may be made of any soft elastic material such as rubber. The seal 22 in the preferred embodiment is a flat ring gasket-type seal that frictionally fits in a slot 55 in the sealing cover 21. Alternatively the seal 22 can be glued to the sealing cover 21. The seal is shaped to seal the entire rim 23, including the spout rim 28. The sealing cover also has an output port 57 which is connected to a vacuum tube 59. The opening of the outlet port 57 is protected by a splash guard 61. The splash guard 61 blocks liquid from splashing the outlet port 57 to prevent the liquid from becoming entrained in the air flow through the vacuum tube 59.

Figure 10:
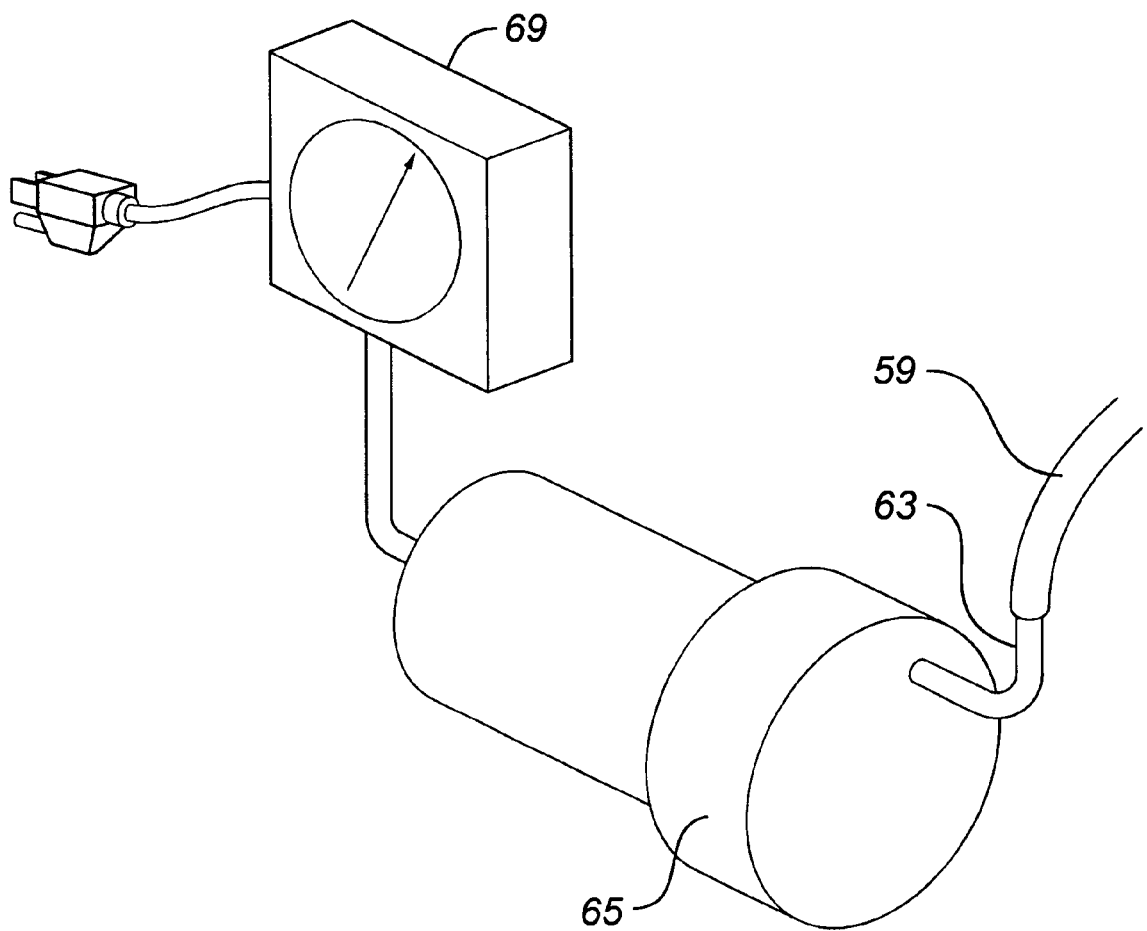
FIG. 10 is a schematic view of the vacuum pump, motor, and timer of the present invention.

While one end of the vacuum tube 59 is connected to the outlet port 57, the other end is connected to the inlet 63 of the vacuum pump 65 as shown in FIG. 10. The vacuum pump 65 in the preferred embodiment is model 007CA13 manufactured by Thomas Compressors and Vacuum Pumps. The vacuum pump 65 is controlled by a timer 69 which allows a user to set the period of time that the pump will operate up to a maximum time of 15 minutes at which point the timer automatically shuts off the vacuum pump 65. The vacuum pump controls 71 are located on the vacuum stand as shown in FIG. 2. The controls include a pause function to momentarily interrupt the process and then to allow the process to continue at the selection of the user.

To operate the present invention, the liquor to be treated is poured into the pitcher 11. Variable volumes of liquor may be treated up to the maximum capacity of the pitcher. The sealing cover 21 is closed over the top of the pitcher to create a seal with the rim 23. The timer is set to the desired treatment period and the process is started. A vacuum is drawn through the vacuum tube and accordingly on the airspace above the liquor in the pitcher 11. The vacuum causes air to be drawn in through the air inlet 35 and to percolate through the holes in the diffusion manifold 43. The bubbles agitate the liquor and facilitate the removal of volatile compounds. Treatment according to the present invention does not significantly change the volume of the liquor nor its alcohol content. There is, however, a noticeable improvement in the aroma and users have commented that the liquor has a smoother taste.

Having described the invention above, various modifications of the techniques, procedures, material and equipment will be apparent to those in the art. It is intended that all such variations within the scope and spirit of the appended claims be embraced thereby.

I claim:

1. An apparatus for treating liquor to remove undesirable volatile compounds from the liquor comprising:
    a pitcher for receiving liquor, said pitcher having a rim around an opening at the top of the pitcher, an internal air passageway, and a support base at the bottom of the pitcher;
    said air passageway adapted for entrance of air and connected to an air opening in the support base for entry of air into the pitcher;
    a vacuum stand adapted to receive the pitcher and having a sealing cover;
    said sealing cover engagable in an air sealing relation with the rim of the pitcher and having an outlet port through which a vacuum may be drawn; and
    a vacuum source in fluid communication with the outlet port of the sealing cover and operable to draw a vacuum on the pitcher.

2. The apparatus of claim 1, wherein said vacuum source is a vacuum pump mounted in the vacuum stand and a motor to drive the vacuum pump.

3. The apparatus of claim 2, further comprising a timer mounted in the vacuum stand for controlling the operating time of the vacuum pump.

4. The apparatus of claim 3, wherein said timer having a pause function to selectively interrupt the operation of the timer.

5. The apparatus of claim 1, further comprising a diffusion manifold in fluid connection with the air opening in the support base for distributing air into the liquor.

6. The apparatus of claim 5, further comprising a receptor slot in the support base adapted for the diffusion manifold to be fitted into the receptor slot.

7. The apparatus of claim 5, wherein said diffusion manifold having a plurality of holes to allow air to percolate into the liquor.

8. The apparatus of claim 5, wherein said diffusion manifold having an internal air passageway formed in an end positioned adjacent to the air opening in the support base.

9. The apparatus of claim 5, wherein said diffusion manifold is integrally formed in the support base.

10. The apparatus of claim 1, wherein said sealing cover is pivotably attached to the vacuum stand and adapted to be moved to a position engaging the rim of the pitcher to form a seal or to a position allowing placement or removal of the pitcher on the vacuum stand.

11. An apparatus for treating liquor to remove undesirable volatile compounds from the liquor comprising:

a pitcher for receiving liquor, said pitcher having a rim around an opening at the top of the pitcher, a hollow grip handle with an internal air passageway, and a support base at the bottom of the pitcher;

said air passageway through the hollow grip handle adapted for entrance of air and connected to an air opening in the support base for entry of air into the pitcher;

a vacuum stand adapted to receive the pitcher and having a sealing cover pivotably attached to the rest of the vacuum stand;

said sealing cover being engagable in an air sealing relation with the rim of the pitcher and movable to allow placement and removal of the pitcher on the vacuum stand;

said sealing cover also having an outlet port through which a vacuum may be drawn; and a vacuum source in fluid communication with the outlet port of the sealing cover and operable to draw a vacuum on the pitcher.

12. The apparatus of claim 11, wherein said vacuum source is a vacuum pump mounted in the vacuum stand and a motor to drive the vacuum pump.

13. The apparatus of claim 12, further comprising a timer for controlling the operating time of the vacuum pump.

14. The apparatus of claim 13, wherein said timer having a pause function to selectively interrupt the operation of the timer.

15. The apparatus of claim 11, further comprising a diffusion manifold in fluid connection with the air opening in the support base and for distributing air into the liquor.

16. The apparatus of claim 15, further comprising a receptor slot in the support base adapted for the diffusion manifold to be fitted into the receptor slot.

17. The apparatus of claim 15, wherein said diffusion manifold having a plurality of holes to allow air to percolate or bubble into the liquor.

18. The apparatus of claim 15, wherein said diffusion manifold having an internal air passageway formed in an end positioned adjacent to the air opening in the support base.

19. The apparatus of claim 15, wherein said diffusion manifold is integrally formed in the support base.

* * * * *